United States Patent [19]

Wrona

[11] 4,441,057
[45] Apr. 3, 1984

[54] CORRECTION APPARATUS FOR A CATHODE RAY TUBE

[75] Inventor: Stanislaw Wrona, Winchester, England

[73] Assignee: International Business Machines Corporation, Armonk, N.Y.

[21] Appl. No.: 214,145

[22] Filed: Dec. 8, 1980

[30] Foreign Application Priority Data

Dec. 15, 1979 [GB] United Kingdom ............... 7943293

[51] Int. Cl.³ ...................... H01J 29/70; H01J 29/76
[52] U.S. Cl. ................................ 315/368; 315/13 C; 315/367
[58] Field of Search .................... 315/13 C, 368, 367

[56] References Cited

U.S. PATENT DOCUMENTS

| | | | |
|---|---|---|---|
| 4,095,137 | 6/1978 | Oswald | 315/367 |
| 4,203,051 | 5/1980 | Hallett et al. | 315/13 C |
| 4,203,054 | 5/1980 | Sowter | 315/368 |

FOREIGN PATENT DOCUMENTS

| | | |
|---|---|---|
| 3576 | 8/1979 | Fed. Rep. of Germany . |
| 1353147 | 5/1974 | United Kingdom . |
| 1586045 | 3/1981 | United Kingdom . |

*Primary Examiner*—Theodore M. Blum
*Attorney, Agent, or Firm*—Frederick D. Poag

[57] ABSTRACT

Non-linearities of an electron beam in a cathode ray tube are corrected in accordance with the position of the beam by circuitry which completes the correction from stored digital values. In response to positional signals X and Y, correction waveforms are generated in analog circuits 8H, 8V and 10. The waveforms are scaled by circuits 11 in accordance with the stored digital values and are summed in circuits 9R to 9L and applied to the windings of the cathode ray tube. Preferably the invention is applied to the correction of misconvergence in a shadow mask color tube.

13 Claims, 8 Drawing Figures

CORRECTION APPARATUS FOR A CATHODE RAY TUBE

FIELD OF THE INVENTION

This invention relates to correction apparatus for a cathode ray tube. The invention will be outlined in relation to the correction of misconvergence in a shadow mask cathode ray tube, but it will become clear that, it is applicable to the correction to other types of non-linearity found in cathode ray tubes, for example misfocusing or pin-cushion distortion.

BACKGROUND OF THE INVENTION

A shadow mask is a parallax device for ensuring color purity in color cathode ray tubes, i.e. that beams from respective electron guns land only on respective different phosphors which emit different colors when activated by an electron beam. The pattern in which each phosphor is deposited on the screen face is identical to a pattern of apertures in the shadow mask but each pattern is slightly displaced from the others to allow each electron gun to see through the apertures only the phosphor it is intended to activate. The patterns usually found are sets of round holes, perpendicular rows of slits, such as in the precision in-line tube, or perpendicular slits extending from top to bottom of the screen, such as in the aperture grid tube.

A problem associated with shadow mask tubes is that of ensuring that beams from different guns coincide at that shadow mask. This ensures that corresponding elements of the phosphor patterns are activated simultaneously by the electron guns so that mixtures of primary colors can produce clearly defined secondary colors. If such coincidence does not occur, separate colors are visible The problem is called the convergence problem and is to some extent subjective, in that a certain degree of misconvergence is not visible to, or can be tolerated by, the viewer of a domestic television set, whereas the same degree of misconvergence would not be acceptable to a viewer, at perhaps one meter from the screen, using a color tube as a data display terminal.

Satisfactory correction of misconvergence in domestic television sets has been achieved by the provision of correction coils which enhance or diminish the effect of the main deflection coils in accordance with the position of the electron beams. The currents for the correction coils are derived directly or indirectly from the currents supplied to the main deflection coils. Such techniques have not yet proved satisfactory in meeting the more demanding standards of a data display terminal, nor have they been successfully applied to large (66 cm) television screens. Adjustments to the current supply consist in a complicated sequence of adjustments to a number of potentiometers and are impossible for the unskilled user.

Another approach is disclosed in British Patent Specification 1,517,119 (U.S. Pat. No. 4,203,051) and in British Patent Application 38584/77 (U.S. Pat. No. 4,203,054). Representations of the correction currents supplied to the correction coils are stored in a digital store, there being, in general, a different correction current for each of 256 areas of the screen. The digital representations of the correction currents are read from the store, and supplied to digital-to-analog converters, connected to the correction coils, synchronously with the scanning of the electron beams across the screen in a line raster. Should misconvergence occur, an operator can change the values in the digital store by operating a keyboard, observing the effect of the changes on test patterns displayed on the screen. It is unnecessary for the operator to correct misconvergence at all areas of the screen. The aforecited U.S. Pat. No. 4,203,054 application describes a technique whereby corrections made at only a few points can be extrapolated to the whole screen. It will be noted that the values held in the digital store directly represent the correction currents.

A disadvantage of the digital convergence correction technique outlined above is its cost. In a conventional three-gun shadow mask tube for each area of the screen, four correction factors are required, namely a correction factor for each beam, and a correction factor for the blue lateral coil. If the screen is divided into 256 areas, 1K byte of storage is required. This is a not insignificant overhead in the cost of a color display terminal. On the other hand, it is highly desirable to retain the advantage provided by the ease with which the user can adjust the convergence by means of the keyboard or some other easily manipulable input device.

Analog computing techniques for correction non-linearities in cathode ray tubes are known. British Patent Specification 1,066,643 discloses cathode ray tube apparatus in which, when it is intended to address the point (x,y) on the tube screen, beam deflection signals of magnitude $x(1+Kr^2)$ and $y(1+Kr^2)$ (K constant, $r^2=x^2+y^2$) are computed by analog circuit means which inter alia determines $\log(xKr^2)$ and $\log(yKr^2)$. This is only one example of many such disclosures in the prior art.

SUMMARY OF THE INVENTION

According to the invention, correction apparatus for a cathode ray tube comprises circuitry adapted to generate correction waveforms in accordance with the position of an electron beam, characterized in that the circuitry computes the correction waveforms as functions of digital values.

The invention does not provide digital representations of the correction waveforms but digital values from which the waveforms can be computed. This substantially reduces the digital storage required.

Since the invention is concerned with apparatus for generating a correction waveform irrespective of the use of the waveform it follows that the invention can be applied to the correction of other non-linearities such as pin-cushion distortion in monochrome or color cathode ray tubes, or focusing errors.

BRIEF DESCRIPTION OF THE DRAWINGS

The invention will further be explained by way of example with reference to the drawings, in which:

FIG. 1 diagrammatically illustrates the invention;

DETAILED DESCRIPTION

Figure 1:
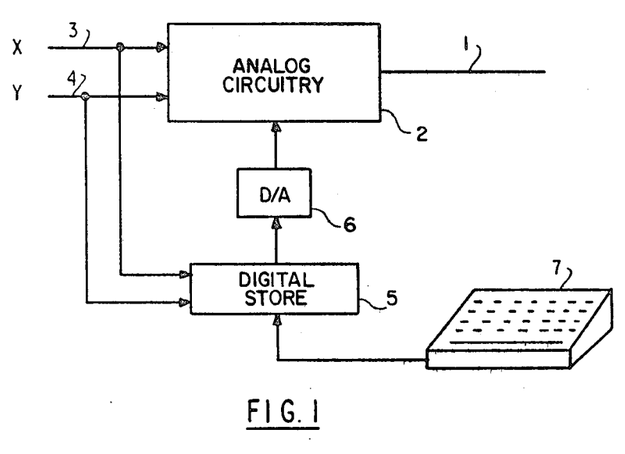

Referring to FIG. 1 of the drawings, wherein the invention is shown in schematic form, beam control information is supplied over a channel 1 to a cathode ray tube, such as a color cathode ray tube (not shown). The control information, which in the preferred embodiment is deflection control information, is generated by analog circuitry 2 which has as inputs analog signal representing the desired positions of the tube beams and analog signals derived from stored digital parameters. The beam position signals are supplied to analog circuitry 2 over conductors 3 and 4, respectively. The signals on conductor 3 represent the desired X coordinate of the tube beams, and the signals on conductor 4 represent the desired Y coordinate of the tube beams. A digital store 5 contains parameters of the calculations effected by circuitry 2. As will be explained, ideally it is desirable to have different parameters for different regions of the cathode ray tube screen. The parameters are supplied to the analog circuitry 2 by way of digital-to-analog conversion circuitry 6 in accordance with the signals on conductors 3 and 4. When the signals on the conductors 3 and 4 indicate that the beams are in a particular area of the screen, the appropriate parameters are made available to the beam circuitry. FIG. 1 illustrates an important advantage of the invention, in that the contents of digital store 5 may readily be changed by means of a keyboard 7, or other suitable interactive device.

In this specification, the invention is described as applied to the correction of misconvergence in a three beam shadow mask color cathode ray tube. Clearly, it is possible to apply the invention to the correction of non-linearities in other types of cathode ray tube based displays, for example, to the correction of misregistration in multiple tube projection systems, or pincushion distortion in a large monochrome tube, or the invention may be used to correct other non-linearities such as focus or color balance.

The correction of misconvergence in a color cathode ray tube involves static and dynamic convergence. Static convergence involves influencing the electron beams by permanent magnetic fields which are adjusted to bring the beams into coincidence at the center of the screen. Convergence over the rest of the screen is effected by continuously varying magnetic fields whose strengths depend on the positions of the beams on the screen. In a delta gun tube, there are four dynamic convergence fields, three of which modify respectively the deflection of three beams, and the fourth of which modifies the lateral position of the blue beam, or in some arrangements of all three beams. In-line tubes use three dynamic convergence fields, affecting the outer two beams and all three beams, respectively. It can be shown that, for domestic television receivers, adequate dynamic convergence correction is obtained by imposing parabolic currents on the line and frame timebases. Reference may be made to Chapter 6 of the book "Colour Television Theory", by G. H. Hutson, published by McGraw-Hill, 1971. It has been found that for the more demanding requirements of a color display terminal more complex correction waveforms are required involving cubic or even quartic functions of the coordinates of the beams. Further, the functions are not constant over the whole screen but vary in accordance with the area of the screen on which the beams are directed. In this specification, we are not concerned with particular formulae for improving the correction of misconvergence, but with a hybrid analog/digital technique for generating any required correction current.

Figure 2:
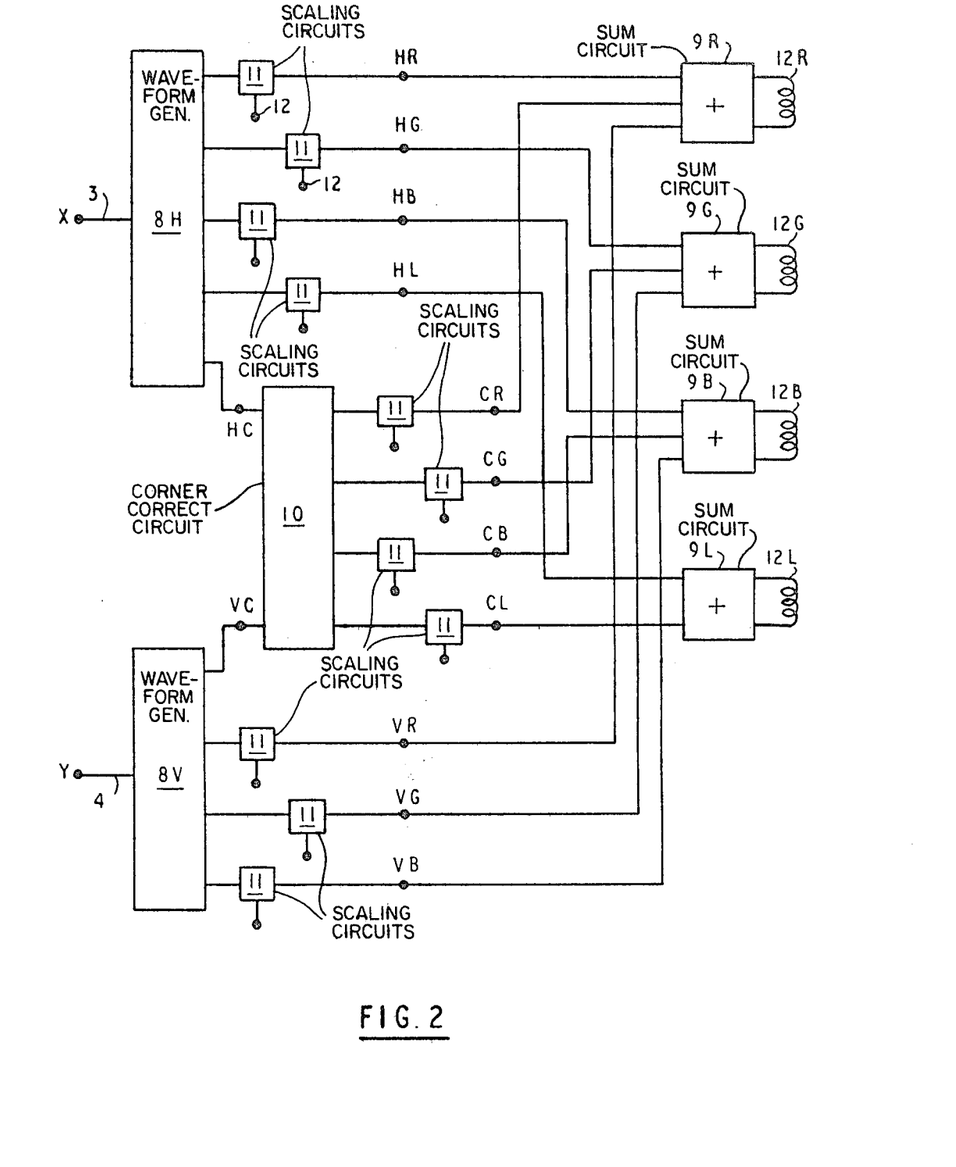
FIG. 2 is a block diagram of the apparatus according to the invention for generating convergence correction waveform.

FIG. 2 is a block diagram of apparatus which uses, inter alia, parabolic correction currents in adjusting the convergence of a delta gun cathode ray tube in which the beams are constrained to trace a horizontal raster.

As in FIG. 1, conductors 3 and 4 receive, respectively, the line and frame timebases, which are, as indicated in FIG. 2, sawtooth waveforms. The line timebase on conductor 3 is converted by a circuit 8H into parabolas, one parabola for each repetition of the line timebase. Outputs from circuit 8H are connected to summing circuits 9R, 9G, 9B and 9L and to a corner correction circuit 10. Although the same parabolic waveform is transmitted on each output of circuit 8H, the size of the waveform on each output is controllably adjusted by scaling circuits 11. Each circuit 11 includes a digital-to-analog converter which receives at an input 12 a digital value. The digital value determines the size of the parabola received at the summing circuit. Effectively, each scaling circuit multiplies a parabolic waveform by a constant. The constant is selectable and, preferably, is supplied from a digital store. A similar arrangement is provided for the frame timebase on conductor 4. A circuit 8V generates a parabola during each repetition of the frame timebase. Scaling circuits 11 determine the size of the parabola supplied to the summing circuits. Outputs from circuit 8V are connected through scaling circuits 11 to summing circuits 9R, 9G, and 9B but not to circuit 9L. Circuit 8V also has an output connected to corner correction circuit 10. The latter generates the product of the line and frame timebases, i.e., it generates a function X.Y. The output of circuit 10 is connected through scaling circuits 11 to the summing circuits 9R, 9G, 9B and 9L. Each summing circuit is connected to respective deflection correction coils 12R, 12G, 12B and 12L, which are arranged in known manner to modify the deflection given to the electron beams by the main deflection coils so as to correct misconvergence of the beams. The circuitry of FIG. 2 has the advantage over known analog convergence correction circuitry that the correction currents in the coils 12R, 12G, 12B and 12L can readily be varied by varying the digital inputs to the scaling circuits 11. The digital values are held in a store and it is a relatively simple matter to change the values, for example, by use of a keyboard as described in British Patent 1,517,119 (U.S. Pat. No. 4,203,051). Further, different digital values can be read from the store as the screen is traversed by the electron beams, thus enabling more accurate correction with relatively simple analog circuitry. One suitable procedure is to envisage the screen as divided into four quadrants by the horizontal and vertical axes passing through the center of the screen. Four digital values are stored for each of the scaling circuits connected to the corner correction circuitry, one value for each quadrant of the screen. Two digital values are stored for each of the scaling circuits connected to the circuit 8H, one value for each of the top and bottom halves of the screen. It is convenient also to provide a scaling circuit with each of the summing circuits, for the purpose of overall adjustment. With the arrangement only 26 digital values need to be stored. By contrast, the system described in the British Patent 1,517,119 (U.S. Pat. No. 4,203,051) referred to, if the screen is divided into 16×16 =256 areas, requires storage space for 1024 digital values, one value for each correction coil for each area. Storage is not expensive, but it is preferable to make as much storage as possible available for data processing activities, such as manipulating the displayed image, rather than for ensuring that the image is clearly displayed.

Figure 3:
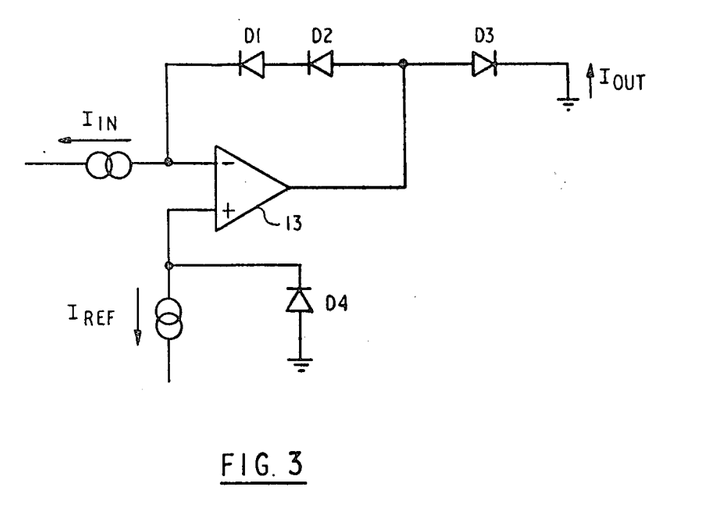
FIGS. 3 and 4 are circuit diagrams of circuitry used in generating waveforms.

FIG. 3 shows the circuit on which the circuits 8H, 8V of FIG. 2 are based. An operational amplifier 13 has diodes D1, D2, series-connected between the output and the negative input to the amplifier. A current source $I_{in}$ is also connected to the negative input. The positive input of the amplifier 12 is connected to ground through a diode D4 and to a reference current $I_{ref}$. Output current $I_{out}$ is taken from the output of the amplifier 13 through a diode D3. To quantify the operation of the circuit of FIG. 3, the diode equation is used:

$$I_d = I_{ds}(\exp(V_d/V_o) - 1)$$

where $I_d$ is the diode current and $V_d$ the voltage across the diode. $I_{ds}$ and $V_o$ are constants of the diode. Solving for $V_d$:

$$V_d = V_o \log((I_d + I_{ds})/I_{ds})$$

In the circuit of FIG. 3:

$$V_{d1} + V_{d2} = V_{d3} + V_{d4}$$

where $V_{d1}$ is the voltage across diode D1, and similarly for the other diodes. If it is assumed that the diodes are matched, so that $I_{ds}$ and $V_o$ are the same for each diode:

$$2 \log((I_{in} + I_{ds})/I_{ds}) = \log((I_{out} + I_{ds})/I_{ds})((I_{ref} + I_{ds})/I_{ds})$$

This gives:

$$I_{out} + I_{ds} = (I_{in} + I_{ds})^2/(I_{ref} + I_{ds})$$

Since $I_{ds}$ is much smaller than the other currents it can be disregarded, giving:

$$I_{out} = (I_{in})^2/I_{ref}$$

With the circuit of FIG. 3, the output current is a quadratic function of the input current multiplied by a constant, determined by the reference current. If required, cubic functions of the input current can be obtained by connecting three diodes in series between the output and input of the amplifier 13 and by adding another diode in series with D4. Using the same principles other functions can be obtained, for example, using three diodes in the feedback loop and two at the output gives an output current proportional to the power 3/2 of the input current, or using single diodes in the feedback loop and at the output with two diodes instead of the single diode D4 gives an output current proportional to the reciprocal of the input current. The polarities of all the diodes and the current sources may be reversed without affecting operation of the circuit although in this case, the polarity of the output is also reversed. As has already been explained, the output of the circuit can be varied by varying $I_{ref}$. $I_{ref}$ and the diode D4 thus correspond to a scaling circuit 11, shown in FIG. 2.

Figure 4:
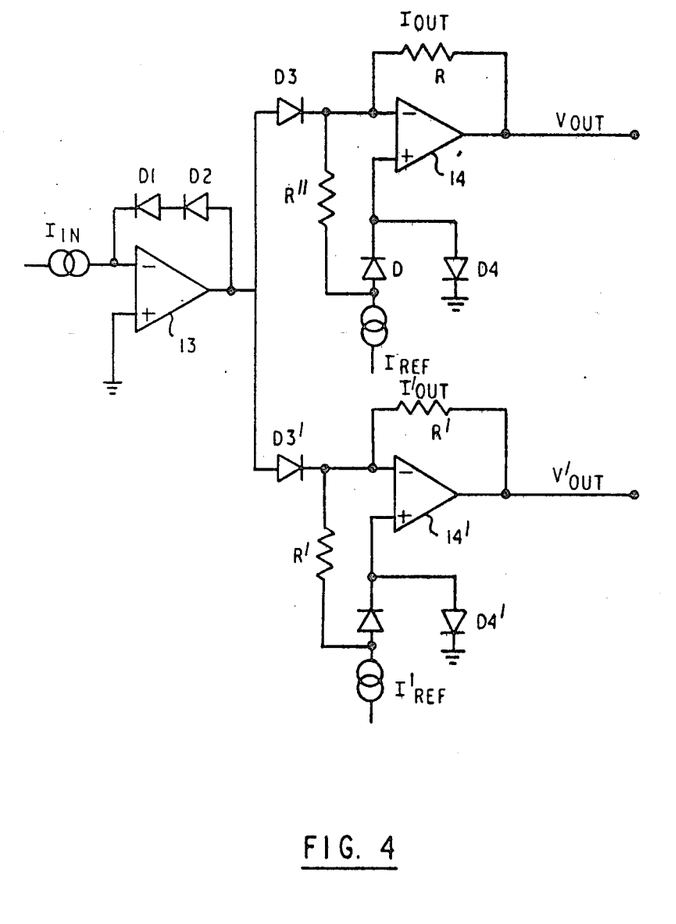

The circuit of FIG. 3 has been described in order to show how the shape of the correction waveform is derived. It is, however, unnecessarily expensive to provide a circuit such as that of FIG. 3 each time a scaled waveform is required and the implementation adopted in FIG. 2 and illustrated schematically in FIG. 4 is to provide the waveform simultaneously on a plurality of channels and to connect a scaling circuit to each channel. It will be noted from FIG. 3 that the output terminal supplying $I_{out}$ is at ground potential, the relatively positive terminal of amplifier 13 is somewhat less negative than the relatively negative terminal. If the relatively positive terminal of amplifier 13 is grounded, this sends the output terminal positive and enables $I_{ref}$ to be connected at this terminal. In fact, a plurality of reference current sources can be connected in parallel at the output terminal of the amplifier. In FIG. 4, two output waveforms are generated. The shape of the waveforms is determined by amplifier 13 and diodes D1, D2, but the magnitudes of the waveforms are in accordance with the value of $I_{ref}$ and $I'_{ref}$. It is inconvenient to provide the outputs in the form of currents so operational amplifiers 14 and 14' are provided to afford voltage outputs, $V_{out}$ and $V'_{out}$, respectively. Each amplifier has a respective resistor R, R' in the feedback connection to the negative input, across which the currents $I_{out}$, $I'_{out}$ are developed. Since in general the output of an operational amplifier does not have the same quiescent (zero) level as the input, this will lead to inaccuracies if the outputs from several channels are summed. Accordingly, a diode and resistor are used to tie the quiescent output level to ground. As shown in the upper scaling circuit of FIG. 4, the diode D is connected in series with D4 and the resistor R'', equal in value to R, is connected between the diode D and the negative input terminal of amplifier 14.

Figure 5:
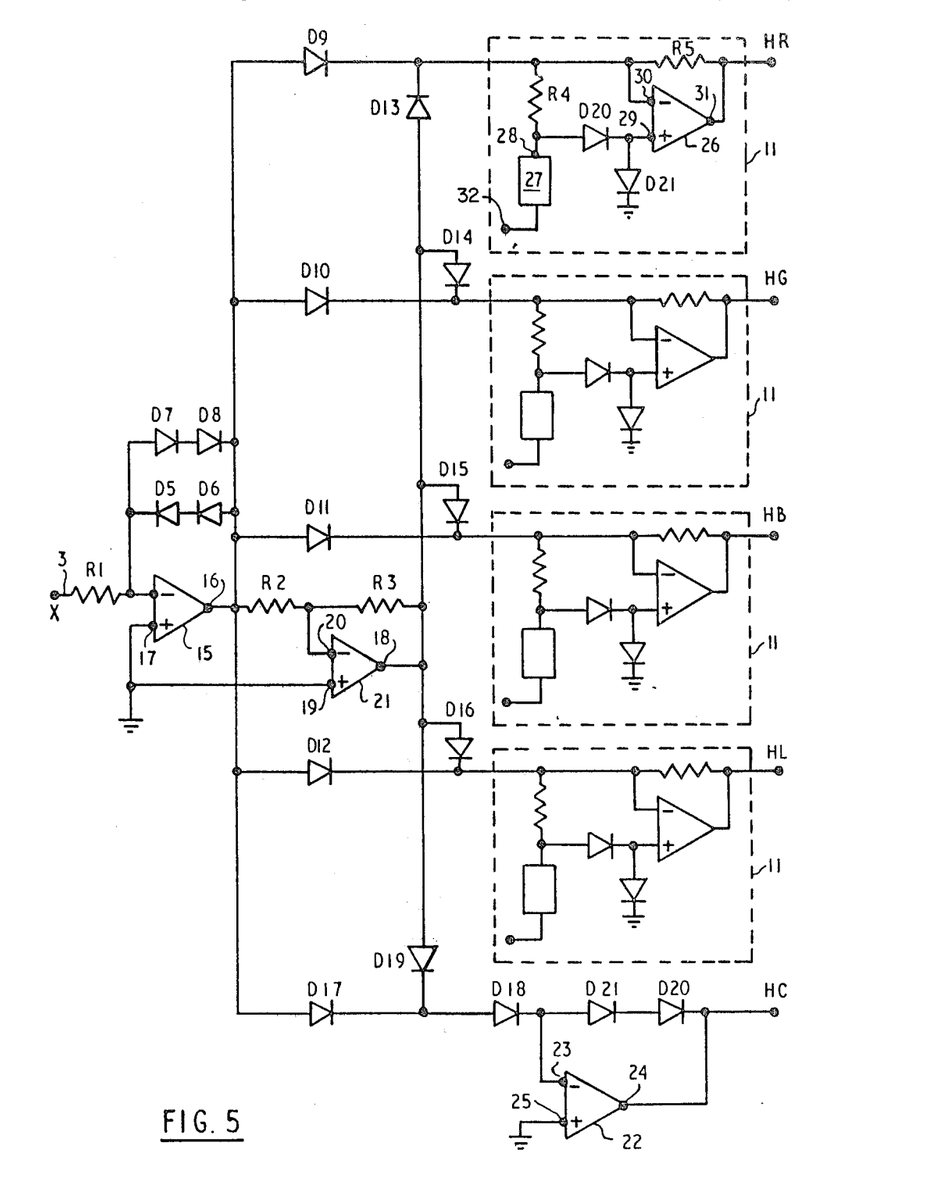
FIGS. 5 to 8 are circuit diagrams of parts of FIG. 2.

FIG. 5 is a circuit diagram of circuit 8H, the scaling circuits 11 connected to circuit 8H and the connection between circuit 8H and corner correction circuit 10, all shown in FIG. 2. Referring to FIG. 5, the negative terminal of operational amplifier 15 is connected to conductor 3 through resistor R1. The output terminal 16 is connected through two feedback paths to the negative input terminal. The first path comprises series-connected diodes D5 and D6, while the second path contains series-connected diodes D7, D8, connected in the opposite direction to the diodes D5, D6. Output terminal 16 of amplifier 14 is also connected through respective diodes D9 to D12 to four scaling circuits 11. The positive terminal 17 of amplifier 15 is connected to ground and to the positive terminal 19 of an operational amplifier 18. The negative terminal 20 of amplifier 18 is connected to output terminal 16 of amplifier 14 through a resistor R2. A resistor R3 connects the output 21 of amplifier 18 to the negative terminal 20. Output 21 is also connected through respective diodes D13 to D16 to each scaling circuit 11. The scaling circuits 11 are connected, respectively, to terminals HR, HG, HB, and HL. The output terminal 16 of amplifier 14 is connected through diodes D17 and D18 to the negative terminal 23 of an operational amplifier 22. The output terminal 21 of amplifier 18 is connected to the terminal 23 through diodes D19 and D18. The output terminal 24 of amplifier 22 is connected to a terminal HC and through diodes D20 and D21 to the negative terminal 23. The positive terminal 25 of amplifier 22 is connected to ground. Each scaling circuit 11 is of identical construction and is as shown in FIG. 5 consisting of an operational amplifier 26 and a digital-to-analog converter 27 of the kind which incorporates a digital register so that it is not necessary that the digital input is maintained to maintain the analog output. The analog output terminal 28 of the converter 27 is connected through diode D20 to the positive terminal 29 of amplifier 26. Diode D20 and terminal 29 are connected to ground through diode D21. Terminal 28 of converter 27 is connected to the negative terminal 30 of amplifier 26 through resistor R4. The output terminal 31 of amplifier 26 is connected to negative terminal 30 through resistor R5. The digital input to converter 27 is received on terminal 32, which in practice consists of a set of terminals providing a parallel input to the converter 27.

The correction waveform produced by the circuitry of FIG. 5 is parabolic in shape and is derived from a sawtooth waveform on conductor 3 which has peaks and troughs symmetrical with respect to ground. This necessitates the two parallel feedback loops between output terminal 16 and the negative input terminal of amplifier 15 since one pair of diodes D5, D6 or D7, D8 is non-conductive during the positive and negative halves, respectively, of the input waveform. The output of amplifier 14 consists of positive and negative half-waveforms of which the negative portions are blocked by diodes D9 to D12 and D17. Amplifier 18 inverts the negative half-waveform so that it is passed by diodes D13 to D16 and D19. Each scaling circuit 11 consists of a digital-to-analog converter 27, which may be for example a Motorola MC 1408-8L, which is connected to a digital store by way of terminal 32. Terminal 32 is representative of eight such terminals at which eight bits are available in parallel from the digital store. The converter 27 incorporates storage devices in which the input bits are retained.

At terminal HC is provided a waveform used in generating the correction to be applied at the corners of the screen. Amplifier 22 and diodes D18, D20 and D21 transform the parabolic waveform present at the cathodes of diodes D17 and D19 into a linear waveform representative of the X coordinate.

Figure 6:
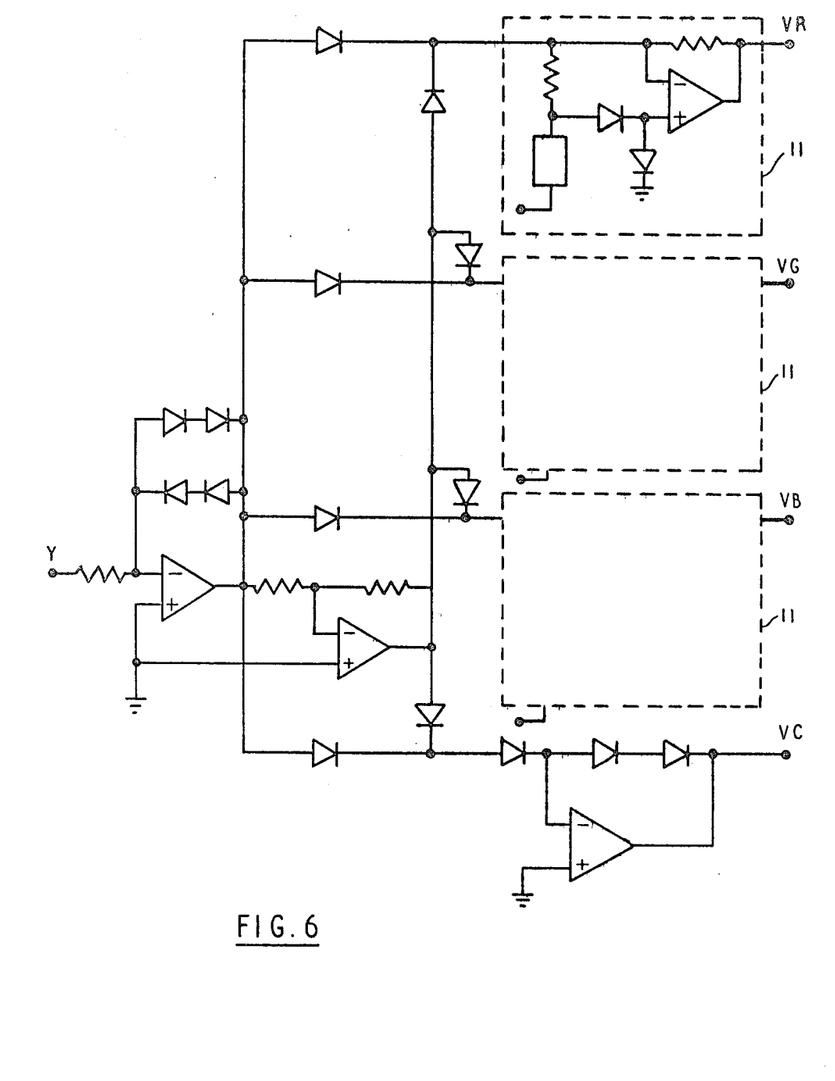

FIG. 6 shows the circuit 8V of FIG. 2 and its connection to the corner correction circuit 10. Comparison of FIGS. 5 and 6 shows that the circuits are identical except for the absence of one output channel. The lateral correction coil does not require a veritcal coordinate input. The input to the circuit of FIG. 6 is the sawtooth frame timebase which determines the Y coordinate of the beams. This is converted to a parabola which is scaled by the scaling circuits 11, parabolic outputs of sizes determined by the scaling circuits being provided at the terminals VR, VG and VB. As explained with reference to FIG. 5, a linear output representative, in this case, of Y appears at terminal VC.

Figure 7:
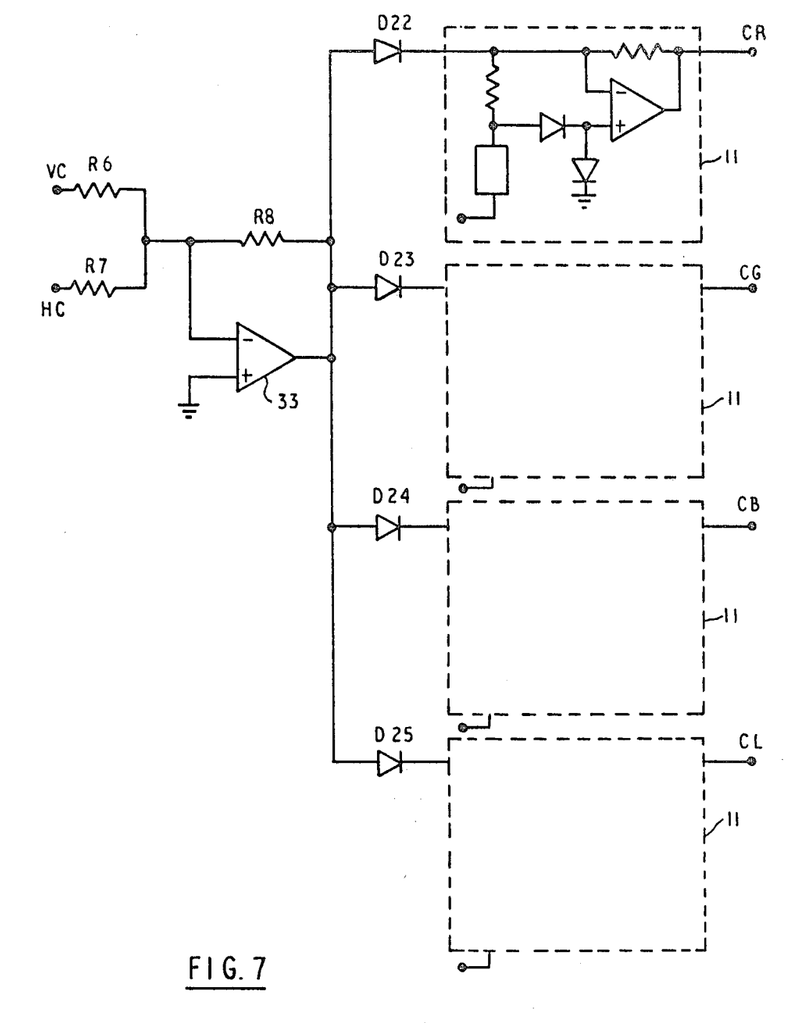

FIG. 7 shows the corner correction circuit 10 of FIG. 2. The circuit is designed to produce the signal X.Y, where X and Y are the signals at HC and VC, respectively. The terminal VC and HC are connected respectively through resistors R6 and R7 to the negative input terminal of an operational amplifier 33. The output terminal of amplifier 33 is connected through parallel-connected diodes D22 to D25 to respective scaling circuits. The outputs of the scaling circuits are connected respectively to terminals CR, CG, CB and CL. The positive input of amplifier 33 is grounded while the output is connected to the negative input through a resistor R8.

The effect of the circuit of FIG. 7 is to multiply the linear signals representing X and Y coordinates of the beam position to give the function X.Y. The function is then scaled by the circuits 11 to produce the required magnitude outputs at terminals CR, CG, CB and CL.

Figure 8:
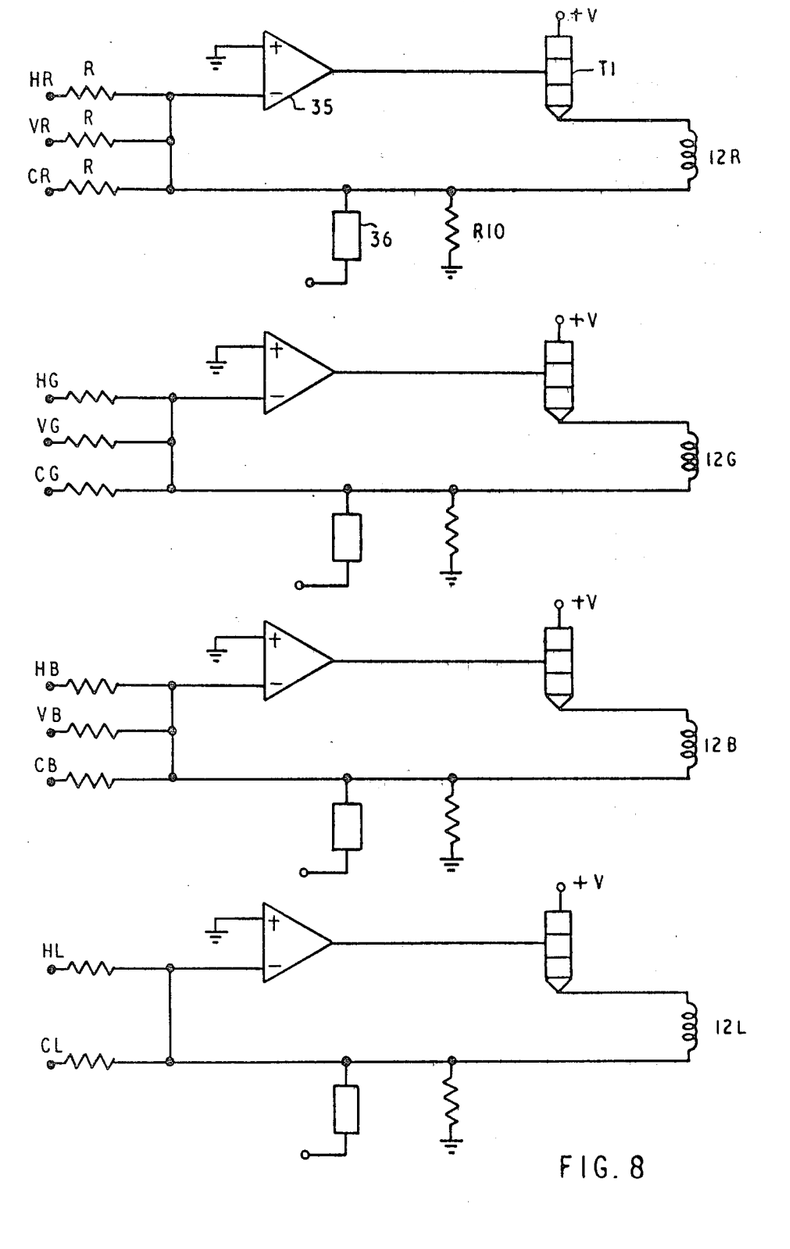

FIG. 8 shows how the signals at the output terminals shown in FIGS. 4, 5 and 6 are combined to provide correction currents to the correction coils 12R, 12G, 12B and 12L of FIG. 2. As is clear from FIG. 8, each correction coil has a similar control circuit and the following description is only of the circuit associated with the coil 12R, which is the coil designed to influence the electron beam from the red gun. The terminals HR, VR and CR are connected through equal resistors R to the negative terminal of an operational amplifier 35, of which the positive terminal is connected to ground and the output to the base of a transistor T1. The collector of transistor T1 is connected to voltage source of potential +V, and the emitter to one end of correction coil 12R. A digital-to-analog converter 36, of the same kind as converter 27 of FIG. 5, is connected to the other end of correction coil 12R, which is also connected to ground through a resistor R10. In operation, the resistance network consisting of resistors R sums the inputs at terminals Hr, Vr and Cr to obtain a voltage which is applied to the base of transistor T1 to control the current flowing through the transistor, the correction coil 12R, and resistor R10 to ground. The absolute value of the current is determined by digital-to-analog converter 36. The higher the current generated by converter 36, the less current is drawn through coil 12R. It is envisaged that the setting of converter 36 will not be changed except to correct ling-term drift, so it could be replaced by a potentiometer. It is more convenient, however, to store digital values to be supplied to the converters 36 and to adjust these values, for example, by means of a keyboard, than to use potentiometers.

The procedure for storing and transmitting the digital values to the digital-to-analog converters is preferably that described in British Patent Specification 1,517,119 (U.S. Pat. No. 4,203,051) referred to above. Digital values are held in a store. Counters operate, in known manner, to generate numbers representing the position of the electron beams on the screen. The counters may be synchronized with the line and frame timebases, for example, the counter holding the count representing the number of the line is stepped by horizontal flyback and reset by vertical flyback. Alternatively, the counter may be the basic timers from which the line and frame timebases are derived. Such arrangements are well-known in the art and will not be described here. As particular counts are reached, signals are transmitted to the store to read appropriate sets of digital values to the analog-to-digital converters. In the preferred embodiment, the digital values change at most in each quadrant of the screen. The four horizontal, three vertical and four corner values for each quadrant can readily be stored in four storage locations, one assigned to each quadrant. At an appropriate time, just before the new quadrant is entered by the beams, the contents of the storage locations are read to a register connected to the analog-to-digital converters. An alternative arrangement which avoids the need to allow for the digital-to-analog converters to settle is to provide two converters, connected in parallel, in each scaling circuit 11 of FIGS. 5 and 6. Instead of transferring one or the other of a pair of digital values to the single converter as the beams traverse the screen, one or the other of the converters, which are supplied with the values each time the display is switched on, are connected into the scaling circuit. The connection may be AND gates at the output of each converter which are opened and closed as the beams move across the screen. It is pointed out, however, that the provision of a single converter is not highly disadvantageous, since the change-over takes place at the parabola minimum, with little or no visible effect on the image at that region. Modification of the digital values held in the store takes place as described in British Patent Specification 1,517,119 (U.S. Pat. No. 4,203,051). The digital values for the analog-to-digital converters 36 of FIG. 7 are also held in the digital store and may be modified in the same way as the result of a test procedure as described in the prior specification.

The amplifiers used may be Texas Instrument amplifiers SN 4741.

There has been described analog convergence correction circuitry which is readily adjustable by means of digital inputs. This hybrid arrangement enables the cheapness of analog circuitry to be combined with the ease of adjustment afforded by the digital inputs.

While the invention has been particularly shown and described with reference to preferred embodiments thereof, it will be understood by those skilled in the art that various changes in form and detail may be made therein without departing from the spirit and scope of the invention.

Having thus described our invention, what we claim as new, and desire to secure by Letters Patent is:

1. Correction apparatus for a cathode ray tube, comprising circuitry adapted to generate correction waveforms in accordance with the position of an electron beam, wherein the circuitry comprises hybrid circuitry which computes the correction waveforms as functions of digital value, and
    wherein the circuitry comprises analog circuitry arranged in operation to generate correction waveforms in accordance with the positions of the electron beams, the correction waveforms being shaped analog waveforms modified in accordance with the said digital values, and
    wherein the correction apparatus is arranged to correct misconvergence in a shadow mask color cathode ray tube, and
    wherein the analog circuitry arranged in operation to generate parabolic waveforms, characterized in that the sizes of the waveforms are determined by at least some of the said digital values.

2. Apparatus as claimed in claim 1, wherein the analog circuitry includes a parabola generation circuitry arranged in operation to generate a parabolic waveform from each cycle of a sawtooth input signal characterized in that the output of the parabola generation circuitry is connected to a plurality of signal channels, each channel including a respective scaling circuit which determines the size of the waveform transmitted on the channel in accordance with at least some of the said digital values.

3. Apparatus as claimed in claim 1 or claim 2 characterized in that the analog circuitry includes product circuitry generating waveforms representing the product of X and Y, where X and Y are coordinates of the positions of the electron beams on the tube screen, and in that the sizes of the waveforms are determined by at least some of the said digital values.

4. Apparatus as claimed in claim 3, wherein the analog circuitry includes product generation circuitry arranged in operation to generate a waveform representing the product of X and Y, where X and Y are coordinates of the positions of the electron beams on the tube screen, characterized in that the output of the product generation circuitry is connected to a plurality of signal channels, each channel including a respective scaling circuit which determines the size of the waveform transmitted on the channel in accordance with at least some of the said digital values.

5. A cathode ray tube display device incorporating correction apparatus according to claim 4.

6. Cathode-ray tube display apparatus comprising a shadowmask color cathode-ray tube, means adapted to scan the screen of the cathode-ray tube with electron beams to display information, analog circuit means adapted to generate convergence correction waveforms for the electron beams as they scan the screen, a writable digital store for storing digital values used in the generation of said convergence correction waveforms, means for presenting stored digital values to said circuit means in accordance with the position of the beams as they scan the screen, and means for changing the stored digital values to correct a test pattern displayed on said screen,
    characterized in that said circuit means includes polynomial generation circuits each arranged in operation to generate a waveform of polynomial form from each cycle of a sawtooth input signal wherein the output of each polynomial generation circuit is connected to a plurality of signal channels, each channel including a respective scaling circuit which determines the size of the polynomial waveform transmitted on the channel in accordance with at least some of said stored digital parameters.

7. Apparatus as claimed in claim 6, wherein the analog circuit includes product generation circuitry arranged in operation to generate a waveform representing the product of X and Y, where X and Y are coordinates of the positions of the electron beams on the tube screen, and wherein the output of the said product generation circuitry is connected to a plurality of signal channels, each channel including a respective scaling circuit which determines the size of the waveform transmitted on the channel in accordance with at least some of the said stored digital parameters.

8. Apparatus as claimed in claim 6 or claim 7, comprising a plurality of summing circuits, one for each correction coil of the cathode-ray tube, and each connected to receive the polynomial waveforms from its associated channels, the output of each summing circuit being supplied to its associated correction coil.

9. Apparatus as claimed in claim 8, wherein each summing circuit includes a digital to analog converter connected to generate a current in accordance with a digital value presented thereto thereby to adjust the value of current flowing in the correction coil.

10. Apparatus as claimed in claim 8, in which the cathode-ray tube employs a delta gun and in which the polynomial generating circuits generate substantially parabolic shaped waveforms.

11. Apparatus as claimed in claim 8, in which the cathode-ray tube employs an in-line gun and in which the polynomial generating circuits generate substantially cubic waveforms.

12. Apparatus as claimed in claim 8, wherein each scaling circuit means includes an operational amplifier and a digital to analog converter connected with its input to receive said digital values and with its output to an input of said operational amplifier.

13. Apparatus as claimed in claim 8, in which the screen is divided notionally into four quadrants, a set of digital values for each quadrant being stored in said digital store and the digital values appropriate to each quadrant being scanned by each electron beam being supplied to the scaling circuit means as that beam enters that quadrant.

* * * * *